(12) United States Patent
Lomax, Jr. et al.

(10) Patent No.: US 7,600,489 B2
(45) Date of Patent: Oct. 13, 2009

(54) HEAT EXCHANGER HAVING PLURAL TUBULAR ARRAYS

(75) Inventors: Franklin D. Lomax, Jr., Arlington, VA (US); John S. Lettow, Washington, DC (US); Brian D. James, Alexandria, VA (US)

(73) Assignee: H2Gen Innovations, Inc., Alexandria, VA (US)

( * ) Notice: Subject to any disclaimer, the term of this patent is extended or adjusted under 35 U.S.C. 154(b) by 988 days.

(21) Appl. No.: 10/791,746

(22) Filed: Mar. 4, 2004

(65) Prior Publication Data

US 2005/0194120 A1 Sep. 8, 2005

(51) Int. Cl.
*F22B 1/02* (2006.01)
(52) U.S. Cl. ........................ 122/31.1; 122/33
(58) Field of Classification Search ............... 122/31.1, 122/33, 34, 83, 44.2, 155.2, 227, 228; 165/157, 165/159, 160, 161, 164
See application file for complete search history.

(56) References Cited

U.S. PATENT DOCUMENTS

| | | | | |
|---|---|---|---|---|
| 2,049,748 A | * | 8/1936 | Rathbun | 165/146 |
| 3,490,521 A | * | 1/1970 | Byerley | 165/158 |
| 3,545,412 A | * | 12/1970 | Kinyon | 122/34 |
| 4,037,648 A | * | 7/1977 | Maitra | 165/157 |
| 4,124,068 A | * | 11/1978 | Thompson | 165/134.1 |
| 4,240,377 A | * | 12/1980 | Johnson | 122/4 D |
| 5,667,005 A | | 9/1997 | Kakutani et al. | |
| 5,915,465 A | * | 6/1999 | Fix et al. | 165/103 |
| 6,497,856 B1 | | 12/2002 | Lomax, Jr. et al. | |
| 6,623,719 B2 | | 9/2003 | Lomax, Jr. et al. | |
| 6,701,718 B1 | | 3/2004 | Pisciotta | |
| 6,957,695 B2 | | 10/2005 | Lomax, Jr. et al. | |
| 2003/0173062 A1 | | 9/2003 | Lomax, Jr. et al. | |
| 2004/0234432 A1 | | 11/2004 | Lomax, Jr. | |
| 2007/0187079 A1 | * | 8/2007 | Shin et al. | 165/159 |

* cited by examiner

*Primary Examiner*—Gregory A Wilson
(74) *Attorney, Agent, or Firm*—Oblon, Spivak, McClelland, Maier & Neustadt, L.L.P.

(57) ABSTRACT

A heat exchange apparatus including a housing, a first array of fluid conduits provided within the housing, and a second array of fluid conduits provided within the housing. The first and second arrays of fluid conduits are configured to carry a first fluid. The heat exchange apparatus also includes a first fluid passageway provided within the housing, where the first fluid passageway is defined by an internal surface of the housing and by a baffle plate. The first fluid passageway is configured to carry a second fluid. The baffle plate is configured to divide the first fluid passageway into a first flow path and a second flow path, where the first array of fluid conduits extends through the first flow path and the second array of fluid conduits extends through the second flow path.

40 Claims, 7 Drawing Sheets

HEAT EXCHANGER HAVING PLURAL TUBULAR ARRAYS

BACKGROUND OF THE INVENTION

1. Field of the Invention

The present invention relates generally to heat exchangers and methods of constructing heat exchangers.

2. Discussion of the Background

Heat exchangers and heat exchange chemical reactors having large arrays of parallel tubes are known in the art. Traditional design practices for such articles are codified in design standards. U.S. Pat. No. 6,497,856 (the '856 patent), which is hereby incorporated by reference, teaches a heat exchange chemical reactor for producing hydrogen from natural gas, propane, liquefied petroleum gas (LPG), alcohols, naphtha and other hydrocarbon fuels. Typical industrial applications include feedstock for ammonia synthesis and other chemical processes, in the metals processing industry, for semiconductor manufacture and in other industrial applications, petroleum desulfurization, and hydrogen production for the merchant gas market. The demand for low-cost hydrogen at a smaller scale than produced by traditional industrial hydrogen generators has created a market for small-scale hydrogen production apparatus (<15,000 standard cubic feet per hour (scfh)). This demand has been augmented by the growing enthusiasm for hydrogen as a fuel for stationary and mobile powerplants, especially those employing electrochemical fuel cells, which require hydrogen as a fuel.

U.S. application Ser. No. 10/436,060 (the '060 application), filed on May 13, 2003, which is incorporated herein by reference, discloses an advantageous heat exchange apparatus that provides a cost-effective heat exchange structure that reduces shell-side fluid leakage and bypass for tubular heat exchangers such as those operated at high temperatures and pressures. FIG. 1 of the '060 application shows a tubular heat exchanger core including an array of tubes 2, which are sealingly connected between a first tubesheet 3 and a second tubesheet 4. A first fluid flows from an inlet manifold sealingly attached to the first tubesheet 3, through tubes of the array of tubes 2, and out a second manifold attached to the second tubesheet 4. The array of tubes 2 is provided on outer surfaces of the tubes with flow directing baffles or plates 5, which are used to cause a second fluid to flow substantially normal to the axis of the array of tubes 2. All of the baffles have a small extended portion 18, which extends outside the flow passageways and finned zones in each fluid stage. The extended portions 18 are provided for mating to refractory ductwork for directing the flow of the second fluid. FIG. 2 of the '060 application shows a structure that provides improved manifolding of the flow within a housing 100 formed by housing members, such as sheet cover pans 20, 30 and portions of various baffles that form part of the outer shell of the heat exchanger, such as portions of baffles 13-16 and 19. The housing 100 can achieve a condition of zero leakage.

However, the inventors of the present invention have determined that the heat exchange apparatus described in the '060 application has certain capacity restrictions that are improved in the present invention. Thermal stress management is one of the largest, if not the largest, limiting factor in the reformer technology described in the '856 patent and the '060 application. Since the reformers tend to operate under high thermal stress, as the reactor is scaled up in size, a high pressure drop (i.e., change in pressure, $\Delta P$) across the tube array can put large stresses on the baffles and the pan ductwork. These large stresses lead to premature failure due to creep at services temperatures. The pressure drop can be lowered by simply increasing the cross sectional area of the heat exchanger stages with attendant larger pan areas, however, the stresses are far greater in larger pans for the same pressure load. Thus, simply increasing the heat exchanger stage area does not provide an adequate solution. Additionally, when the reactor is scaled up in size, the overhanging burner box is plagued by high stresses, due to the large size of the pans and due to the cantilever forces from the burner. Furthermore, very big reactors require very thick tubesheets. These thick, beefy tubesheets are not only expensive, but they are also very rigid. Thus, large offset holes are required in the tubesheets in order to prevent the thermal expansion of the tubesheets from damaging the array of tubes extending therethrough, although such holes can be minimized as discussed in U.S. Pub. No. 2003/0173062A1, which is hereby incorporated in its entirety by reference. Such large through-holes limit the effectiveness of the reformer by causing bypassing of the tube arrays.

It is therefore desirable to provide a heat exchange structure that overcomes the capacity restrictions discussed above.

In the manufacture of hydrogen, and especially in the manufacture of hydrogen according to the process of U.S. Pat. No. 6,623,719 (the '719 patent) wherein the combustion air is preheated in the cooling of the water gas shift process, the simultaneous control of the flame temperature, water gas shift process temperature and steam reformer inlet temperatures can be extremely difficult. Departure from the preferred temperature conditions can cause poor fuel conversion, high thermal stresses, excessive corrosion, and problems with local condensing and reboiling of steam within the system. These deficiencies are particularly problematic during transient operation, such as startup, shutdown and load changes. It is therefore desirable to provide apparatus for and a method of controlling undesirable departures from the preferred operating temperatures.

In the '719 patent, some thermal energy is lost to the ambient as waste heat after the water gas shift process in the process condenser. This wasted heat energy undesirably increases the operating cost of the hydrogen process and increases emissions of climate change gases. It is therefore desirable to provide apparatus for and a method of recovering additional waste heat that is economical to build and does not adversely impact the operability of the hydrogen generating process.

SUMMARY OF THE INVENTION

The present invention advantageously provides a heat exchange apparatus including a housing having a first fluid passageway provided therein. The first fluid passageway is defined by an internal surface of the housing and by a baffle plate. The first fluid passageway is configured to carry a second fluid. A first array of fluid conduits and a second array of fluid conduits are provided within the housing. The first array of fluid conduits and the second array of fluid conduits are configured to carry a first fluid. The baffle plate is configured to divide the first fluid passageway into a first flow path and a second flow path, and the first array of fluid conduits extends through the first flow path and the second array of fluid conduits extends through the second flow path.

The present invention also advantageously provides a bottom module including the housing and first fluid passageway, and a top module having an additional fluid passageway extending therethrough and including a superheater section, a boiler section, and a preheater section. The top and bottom module and the fluid passageways therein have a vertical arrangement that advantageously utilizes buoyancy of heated fluid flowing through the passageways in order to create a natural draft through the top and bottom modules, thereby reducing pressure inside the heat exchanger. Ideally, a vacuum is attained inside the reformer housing. This effect can also be supplemented with the addition of an exhaust fan.

The present invention also provides an air diverting means and a method of use to facilitate accurate dynamic control of the process temperatures during all operating modes. The present invention also provides a heat recovery air preheater that may be closely mechanically-integrated into the reactor of the present invention or the reactor of the '856 patent to facilitate improved heat recovery when compared to the process of the '719 patent. A method of operating the improved heat recovery means either independently, or more preferably in conjunction with the air diverting means is also provided.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE INVENTION

Figure 1:
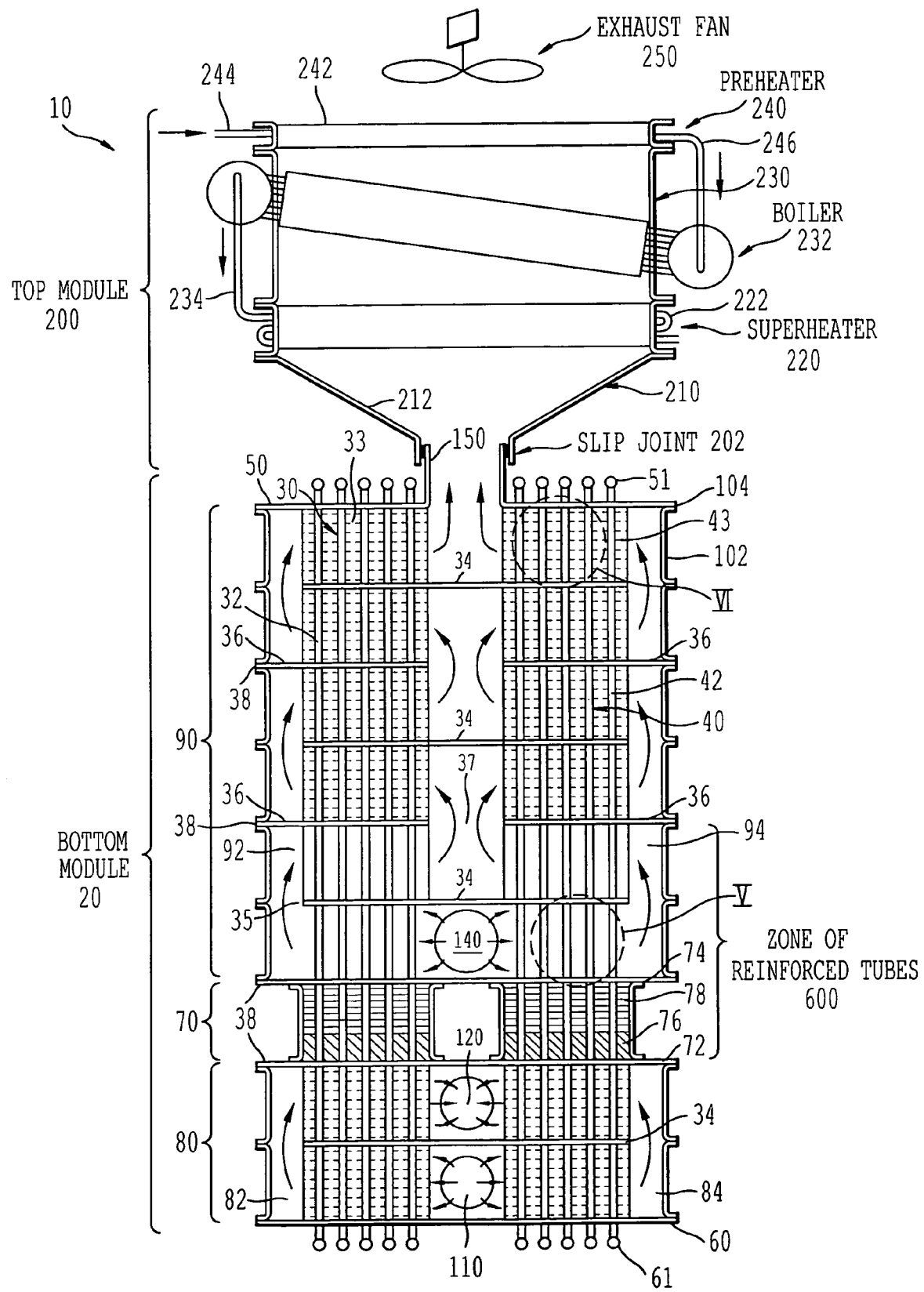
FIG. 1 depicts a front, cross-sectional view of a first embodiment of a heat exchanger of the present invention.

Embodiments of the present invention will be described hereinafter with reference to the accompanying drawings. In the following description, the constituent elements having substantially the same function and arrangement are denoted by the same reference numerals, and repetitive descriptions will be made only when necessary.

Figure 2A:
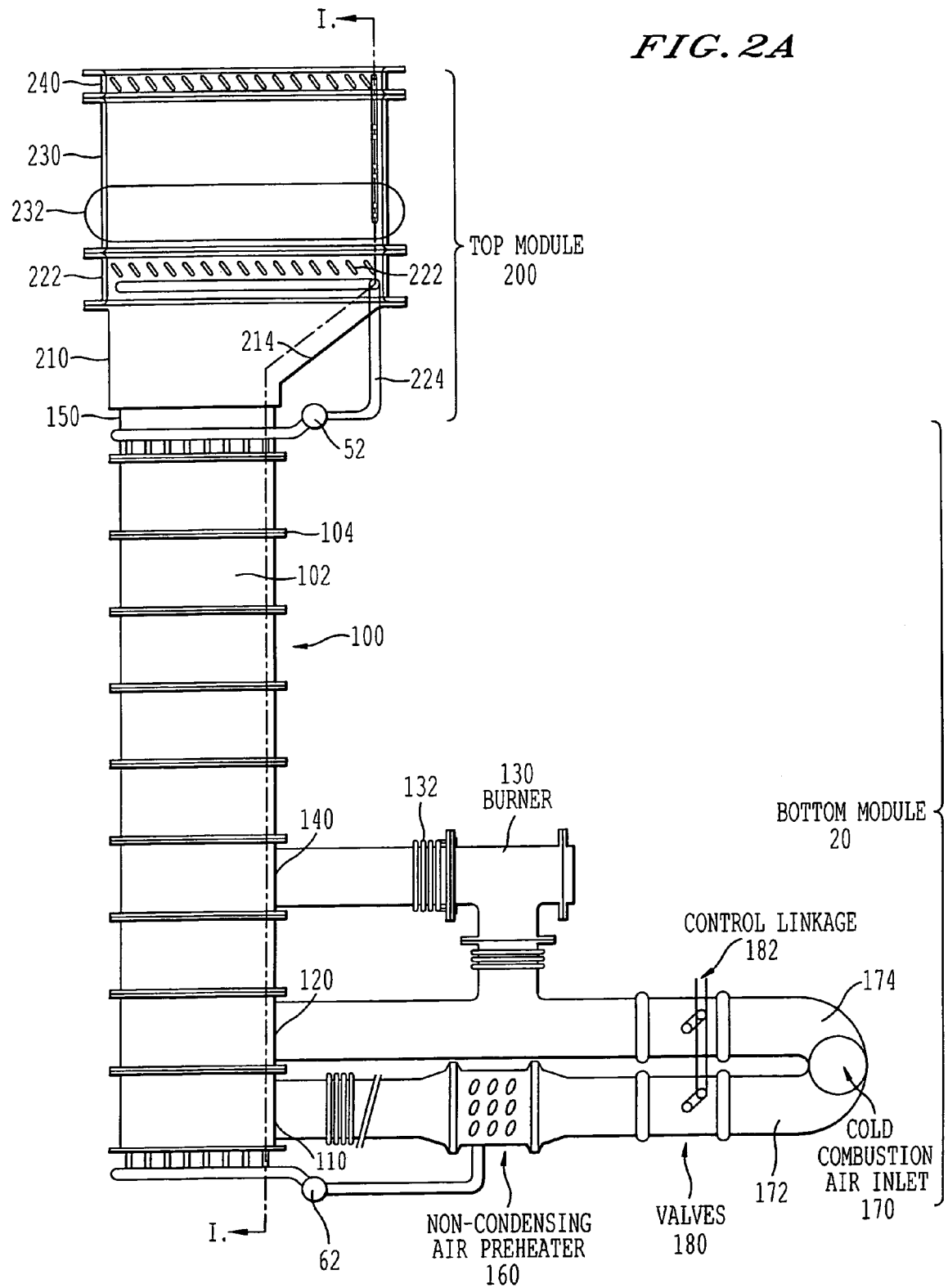
FIG. 2A depicts a side view of the top and bottom modules of the heat exchanger of FIG. 1.

FIG. 1 shows a heat exchanger 10 including a bottom module 20 having a first tubular heat exchanger core 30 and a second tubular heat exchanger core 40. The first core 30 includes an array of substantially-parallel conduits or tubes 32, which are sealingly connected between a first tubesheet 50 and a second tubesheet 60. The second core 40 includes an array of substantially-parallel conduits or tubes 42, which are sealingly connected between the first tubesheet 50 and the second tubesheet 60. A first fluid flows from one of a plurality of inlet manifolds 51 provided adjacent to the first tubesheet 50, through tubes of the array of tubes 32 and the array of tubes 42, and out of one of a plurality of second manifolds 61 provided adjacent to the second tubesheet 60. The manifolds 51 and 61 are shown in FIG. 2A as connected to manifold pipes 52 and 62, however, alternatively the manifolds can be one or more chambers sealingly attached to the respective tubesheets. In the present embodiment of the invention, one or more rows of tubes of the array of tubes 32, 42 can be attached to a single inlet manifold 51 and/or a single outlet manifold 61. For example, two rows of tubes in the array of tubes 32 can be fluidly connected to a single inlet manifold pipe 51 and a single outlet manifold pipe 61.

The tube arrays 32 and 42 are provided on outer surfaces of the tubes with flow directing baffles or plates 34, 36, which are used to cause a second fluid to flow substantially normal to the axis of the tube arrays 32 and 42. One or more baffles 34, 36 may be provided to produce several consecutive stages of cross-flow of the second fluid across the array of tubes, which conveys the first fluid. The baffles 34, 36 are configured to provide a serpentine flow of second fluid through the bottom module 20. The baffles 34 extend across the central portion of the bottom module 20 and provide flow gaps 35 at outer sides of the bottom module 20. The baffles 36 are configured such that two baffles 36 are provided at the same elevation within the bottom module 20 such that the two baffles 36 extend inward from the sides of the bottom module 20 and provide a central flow gap 37. Thus, the second fluid is directed to split in two directions to flow around baffle 34 and through flow gaps 36 and then rejoin at a central portion and flow though the central flow gap, as indicated by the flow arrows in FIG. 1. The baffles 34, 36 in FIG. 1 are of a preferred rectangular planform. The tubular arrays 32, 42 of FIG. 1 are likewise rectangular, although the present invention is in no way limited to tubular arrays and baffles having a rectangular planform, and can be provided with any planform desired.

The bottom module includes lower flow passages 80 that extend from an inlet 110 to an outlet 120, and upper flow passages 90 that extend from an inlet 140 to an outlet 150. In the lower flow passages 80, the flow of second fluid enters through inlet 110, which is located in a central portion between the tubular arrays 32, 42. The baffle 34 causes the second fluid within the lower flow passages 80 to divide such that a first flow path 82 is created around one side of the baffle 34 and a second flow path 84 is created around the other side of the baffle. The portion of the second fluid that travels along the first flow path 82 is directed through the tubular array 32, and the portion of the second fluid that travels along the second flow path 84 is directed through the tubular array 42. The portion of the second fluid that travels along the first flow path 82 and the portion of the second fluid that travels along the second flow path 84 join at the central location and exit through outlet 120. In the upper flow passages 90, the flow of second fluid enters through inlet 140, which is located in a central portion between the tubular arrays 32, 42. The baffle 34 causes the second fluid within the upper flow passages 90 to divide such that a first flow path 92 is created around one side of the baffle 34 and a second flow path 94 is created around the other side of the baffle. The portion of the second fluid that travels along the first flow path 92 is directed through the tubular array 32, and the portion of the second fluid that travels along the second flow path 94 is directed through the tubular array 42. The portion of the second fluid that travels along the first flow path 92 and the portion of the second fluid that travels along the second flow path 94 join at the central location where they travel upward through gap 37 to the next level, where the flow split is repeated.

FIG. 1 depicts a heat exchanger core configured to provide the flow arrangement of the '856 patent, which is incorporated herein in its entirety. The baffles 34, 36 can be arranged to execute any sort of flow pattern desired, such as a simple counterflow or parallel flow heat exchange. In the flow arrangement depicted in FIG. 1, the flow of the second fluid is divided into two separate flow passageways by a sealing zone 70. In FIG. 1, a sealing method of refractory felt gaskets is employed in the sealing zone 70 between the lower flow passages 80 and the upper flow passages 90. The second fluid may flow through both of these passages after some intermediate processing, such as adding fuel to the second fluid including air and burning the resultant mixture, or a distinct third fluid may flow in one of the passages. In either case, it is likely that the fluid pressure of the streams in flow passages 80 and 90 will be different, and thus a pressure gradient will exist across the sealing zone 70.

Figure 6:
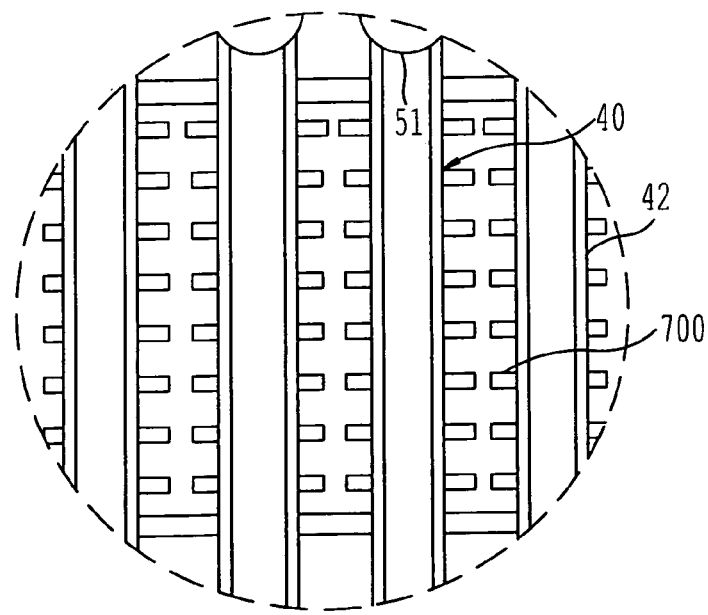
FIG. 6 depicts an enlarged cross-sectional view of an array of tubes having heat fins.

It should also be noted that heat exchange fins 33, 43 may be advantageously placed on outer surfaces of the tubes in the tubular arrays 32, 42 to increase heat transfer area, protect against corrosion, and provide mechanical support to the tubes. The heat exchange fins can be plates that extend across all of the tubes of the tubular array 32 and plates that extend across all of the tubes of the tubular array 42, or the fins can consist of strip-like plates (or "banked fins") 700 that extend across all of the tubes in a one or more rows of tubes of the tube arrays 32, 42, as depicted in FIGS. 1 and 6. The strip-like plates 700 are preferred for situations where thermal gradients across the cross-flow stage are sufficiently high to impose deleterious mechanical stress on the tubes 42. In situations where thermal stresses are not damaging, a greater number of tube rows are preferably encompassed in a single fin to reduce assembly time and expense for the heat exchanger. In the embodiment depicted in FIG. 1, the rows of tubes in the tube arrays 32, 42 are each connected to a single tube 51 (which can also be referred to as a tubular inlet manifold) at the top of the bottom module 20 and all of the tubes 51 are then connected to the inlet manifold 52, and the rows of tubes in the tube arrays 32, 42 are each connected to a single tube 61 (which can also be referred to as a tubular outlet manifold) at the bottom of the bottom module 20 and all of the tubes 61 are then connected to the outlet manifold 62. Since each row of tubes in the tube arrays 32, 42 are each connected to individual tubes 51, 61, then, for thermal expansion reasons, it is preferred to utilize strip-like plates 700 for the heat transfer fins in order to reduce any stress on the inlet manifold 52 and the outlet manifold 62 by the individual tubes 51, 61. When compared to the rigid tube sheets of the '856 patent, which imposes differential thermal expansion stresses in two axes in the plane of the tubesheet, the manifolds 51, 61 of the present invention advantageously exert differential expansion stresses in only one axis. Thus, the methods for reducing the effects of thermal expansion described in U.S. Pub. No. 2003/0173062A1 may be advantageously employed with a reduced amount of flow bypassing. The importance of this advantage increases as the physical size of the heat exchanger increases.

One feature apparent in FIG. 1 is the various sizes of the baffle plates. Baffle plates 34, 36 prevent flow of the second fluid parallel to the tubes, while permitting flow in this direction through the gaps 35, 37. Full baffle plates 72, 74 are provided on either side of the sealing zone 70 and prevent any flow of the second fluid parallel to the tube arrays 32, 42. All of the baffle plates 34, 36, 72, 74 depicted in FIG. 1 are formed with a small extended portion 38 (the extended portions of baffle plates 34 are not shown in FIG. 1, but extend along the front and rear sides of the housing 100), which extends outside the flow passageways and finned zones in each fluid stage where the baffle plate adjoins and is mounted to the housing members. The extended portions 38 are provided for mating to refractory insulation and for providing a thermal expansion means for the ductwork structure as per the method of the '060 application.

FIGS. 1 and 2A depicts a housing 100 formed by housing members, such as sheet cover pans 102. The housing 100 of the present invention can achieve a condition of zero leakage. The housing 100 is constructed by created flange joints at the locations where adjacent edges of the cover pans 102 are joined. Flange joints are also formed at locations where extended portions 38 of the baffles 34, 36 are sandwiched between edges of adjacent cover pans 102. Flange joints 104 can be made essentially fluid impermeable by methods such as welding, brazing, adhesive bonding, roll forming or other methods apparent to one of ordinary skill in the art. It is particularly advantageous to weld or roll-form the flange joints at the joints between of the edges of the cover pans and the baffles 34, 36, such that the flanged edges of the cover pans may elastically-deflect under differential thermal expansion to relieve stresses on the assembly and prevent permanent deformation of the baffle, the pans, or both. This embodiment of the present invention advantageously accommodates elastic deflections both parallel and perpendicular to the tube arrays.

In an alternative embodiment of the present invention, one or more of the cover pans 102 may be attached by bolts, screws, or other removable fixing devices. In such an embodiment it is preferable to provide a stationary sealing member in between the adjacent cover pans 102, and between the cover pans 102 and the extended portion 38 of the baffle plates 34, 36. An advantage of this alternate embodiment is that the cover pans may be removed to inspect and/or clean the heat exchanger core including the heat exchange arrays 32, 42. This feature is highly-desirable under some heat exchanger service conditions, where corrosion or deposition of fouling are expected to be high.

The cover pans 102 of the present invention may be made of any material compatible with the operating conditions. It is, however, preferred to construct the baffle pans from metal sheet stock. The flange features are then very easily formed using typical sheet metal processing, and the fluid joints can be readily made.

FIG. 2A shows the heat exchanger 10 of FIG. 1 outfitted with a burner 130 provided between an outlet 120 of the lower flow passages 80 and the inlet 140 of the upper flow passages 90. The lower flow passages 80 have an inlet 110, which introduces the second fluid into the heat exchanger, and the upper flow passages 90 have an outlet 150, which discharges the second fluid into the top module 200. The heat exchanger 10 can optionally include an air preheater 160 that heats the second fluid prior to the inlet 110 using the heated first fluid from the second manifold 62. In this optional embodiment, the second fluid enters a cold combustion air inlet 170 and can travel either to the air preheater 160 along passage 172 and then to the inlet 110, or the second fluid can travel from the cold combustion air inlet 170 along passage 174 directly to the burner 130. The flow of the second fluid along passages 172, 174 is controlled by valves 180, which can be, for example, proportional butterfly valves controlled by actuator configured to drive a control linkage 182 connected to both valves 180 or individual actuators configured to control the valves 180 independently. The valves 180 control the temperature of the second fluid exiting the outlet 120 of the lower flow passages 80 and the temperature of the second fluid entering the burner 130. In an alternative embodiment, the two valves may be replaced with a single valve that continuously modulates flow between the passages 172, 174, such valves are known in the art and referred to variously as diverter or selector valves. In another alternative embodiment, one passage may be provided with a continuously modulating valve while the other passage is provided with no valve. In this embodiment, pressure losses in the system are advantageously reduced but the range of flow variation is disadvantageously decreased. This alternative embodiment may be preferred in situations where only a small dynamic range of flow ratios between the two passages is desired.

In one embodiment of the present invention the heat exchanger 10 is employed for the production of hydrogen, and the tubes 32 and 42 are provided with appropriate catalysts as disclosed in the '856 patent. In this embodiment, the first fluid exits the zone corresponding to the lower flow passages 80 of the bottom module 20 after undergoing a catalytic, non-isothermal water gas shift reaction as described in the '856 patent as well as in the '719 patent, which is hereby incorporated by reference in its entirety. Both the '856 patent and the '719 patent teach that the first fluid may be further reacted in a water gas shift reactor operating under essentially-adiabatic conditions. In the '856 patent, this reactor may optionally be appended to the tube sheet at the exit of the zone corresponding to the lower flow passages 80. However, the rigid tube sheet of the '856 patent undesirably imparts thermal stresses to the heat exchanger, reducing its service life or alternatively requiring extensive measures to mitigate the effects of the thermal mismatch in the heat exchanger. It is advantageous to provide a separate reaction vessel for the execution of the water gas shift reaction subsequent to the exit of the first fluid from the manifold pipe 62. Reactor vessels and attendant connections suitable for this purpose are known to those of ordinary skill in the art.

Subsequent to the further water gas shift reaction which is desirably executed according to the methods of the '856 and '719 patents, the first fluid retains a great deal of sensible heat and latent heat associated with the condensation of steam. If this heat is recovered by the second fluid, it desirably reduces the fuel consumption required to generate hydrogen according to the '856 and '719 patents. Provision of an air preheater may thus achieve this reduction in fuel use, and is desirable when fuel costs are high or when emissions of byproduct gases such as $CO_2$ are undesirable.

The embodiment of FIG. 2A advantageously allows for independent control of the amount of heat recovered from the first fluid and the temperature of at least one other point. For instance, in the case of a hydrogen generator wherein the second fluid is combustion air, the flowrate of the air may be modulated to achieve a desired temperature of the first fluid exiting the zone corresponding to the lower fluid passages 80 through the manifold pipe. This degree of control may advantageously allow the fine adjustment of reaction conditions in the subsequent water gas shift reactor. Thus, the reactor's operating characteristics may be optimized to yield the smallest size, greatest hydrogen production, lowest methanation rate, etc. By simultaneously varying the flowrate of fuel to the burner 130, the flame temperature at the inlet 140 to the upper steam reforming zone corresponding to the upper flow passages 90 may also be controlled. This advantageously permits close control of the maximum temperature experienced by the tubes 32, 42, thus permitting increased life of the heat exchanger.

Further control of temperatures may be advantageously obtained by selecting the heat transfer capacity of the various heat exchange elements. Thus, the temperature of the mixed burner inlet air to the burner 130 may be modulated below the maximum permissible limit for the burner assembly. The temperature of the mixed steam and fuel in the inlet manifold 52 to the steam reforming zone corresponding to the upper flow passages 90 may also be modulated to optimize performance according to the teachings of the '856 and '719 patents. This may be achieved while also maintaining the flame temperature at inlet 140, the water gas shift temperature and, by proper heat exchanger design, the temperature of the burner inlet air. This degree of process control permits much greater operational stability of a hydrogen generator employing the valves 180, and may be advantageously employed whether or not an air preheater is used. The control valves 180 thus provide a surprising ability for a hydrogen generator of the present invention to be operated at conditions other than the full design flowrates without significant deviations from the preferred process conditions, such as those enunciated in the '856 and '719 patents. Further, the modulating valves and air preheater of the present invention may be advantageously employed with related art steam reformers and water gas shift reactors without limitation.

In another embodiment of the present invention, a hydrogen generator employing the modulating valves 180 and the air preheater 160 is designed such that the amount of heat transferred between the first and second fluids in the air preheater is not sufficient to cause significant condensation of the water vapor in the first fluid. This embodiment is preferred in situations where the flashing of condensed water when removed from the system in a water separator is undesirable. This may be due to objectionable noise generated by the phase transition, by increased wear on the valve used to void the condensed water, or due to concerns of corrosion or valve durability in handling the high temperature condensed water. It may also be desirable to limit the heat transfer to eliminate condensing under conditions where the attendant burner air inlet temperature would exceed the permissible limits. Thus, although the greater heat transfer in a condensing air preheater may be preferred where savings in fuel usage are a determining factor, other situations may make the employment of a non-condensing preheater more desirable. The characteristics of the heat transfer surfaces of the air preheater and the heat exchanger zone corresponding to the lower flow passages 80 may be selected to achieve the desired heat flux using techniques known to one of ordinary skill in the art.

Figure 2B:
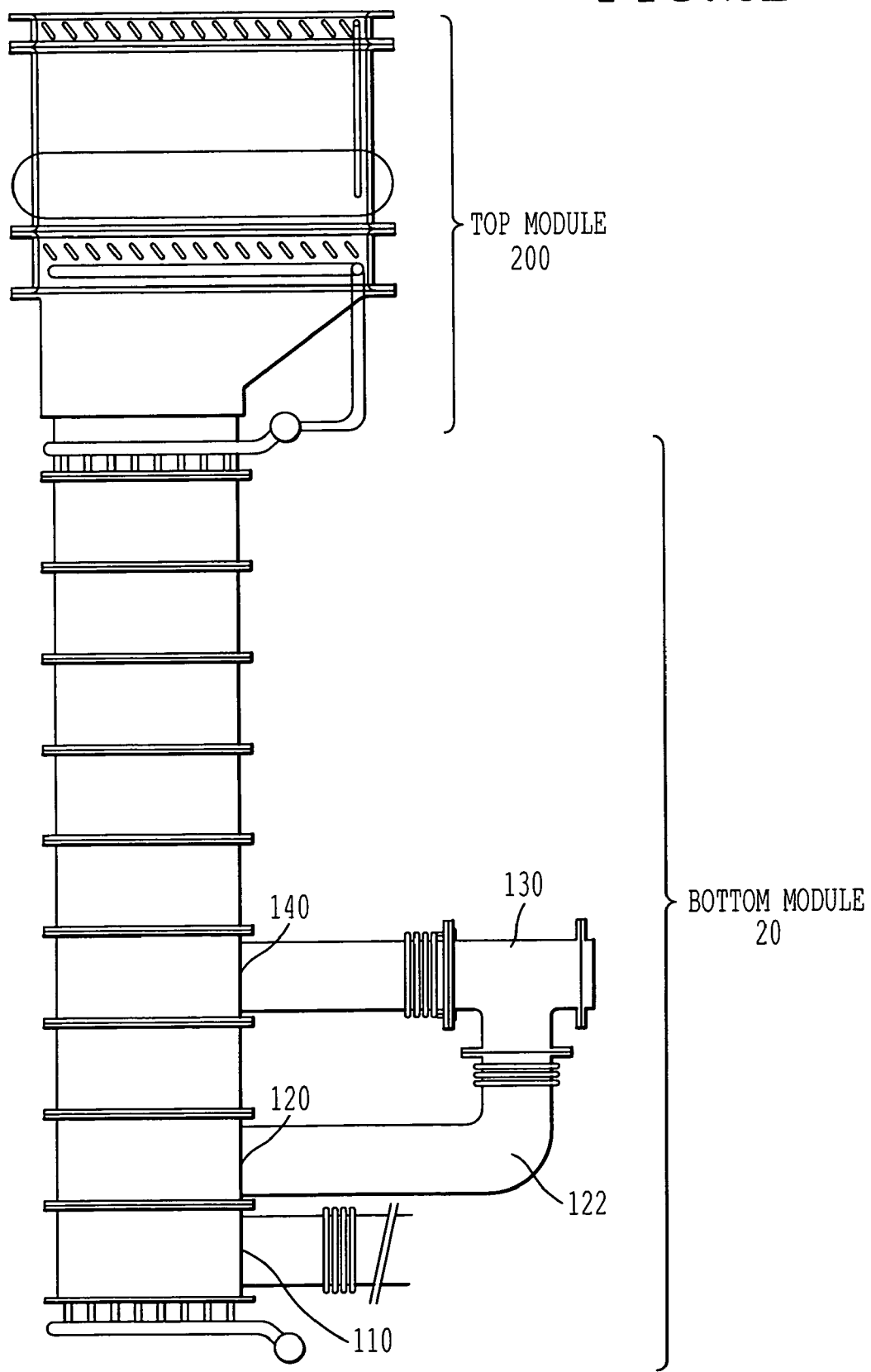
FIG. 2B depicts a side view of an alternative embodiment of the heat exchanger.

FIG. 2B depicts an alternative embodiment of the heat exchanger. The embodiment depicted in FIG. 2B is identical to the embodiment of FIG. 2A, except that the alternative embodiment does not include the air preheater 160, the cold combustion air inlet 170, and valves 180 of FIG. 2A, but rather a simplified connection to inlet 110 and a simplified connection between the outlet 120 and the burner 130 via passage 122.

The modulating valves of the present invention provide especial advantage in operation of a hydrogen plant during startup, shutdown and idle. During startup, the alternate embodiment 2B must supply all burner air through the simplified conduits. This airflow removes an undesirably high amount of heat from the first fluid, which would otherwise be used to increase the temperature of the zone corresponding to the lower flow passages 80 and the subsequent water gas shift reactor. This heat removal may cause extensive condensation within the first fluid passages. This condensation may undesirably impede flow of the first fluid. It may also cause physical or chemical damage to the catalysts disposed within the tubes 32, 42 and the subsequent water gas shift reactor, if used. Thus, in a preferred embodiment of the present invention, a hydrogen plant provided with modulating valves 180 may substantially-reduce second fluid flow through the zone corresponding to the lower flow passages 80, thus decreasing cooling of the first fluid, diminishing condensation, and reducing the time required for startup.

During shutdown and idle, the modulating valves may be employed much as above to regulate the temperatures of the first fluid. Depending upon the system operating details, shut-off and idle conditions may present risks of undesirable high or low temperatures. Further, undesirable backflow to the second fluid supply may also occur. By proper use of the modulating valves, these conditions may be completely avoided. A preferred method of operating the plant in a transition from a hydrogen producing mode of operation to a hot idle operation is to use the valves 180 to block flow through the upper passage 174, while permitting flow through passage 172. The supply of air through the inlet 170 is also terminated. In this state, the buoyancy of the heated air between passage 172 and 174 will not cause an undesirable movement of heat to the valve or attached piping. Instead, the static pressure difference between the passage 172 and the preheater 240 will cause any airflow to move from the passage 172 to the preheater without unduly heating valves 180.

All of the FIGURES have illustrated cover panels covering an entire side of a polygonal tube array with one panel. In some applications, the service pressure and temperature combined with the dimension of the heat exchange core make it desirable to provide a number of sub-panels on one or more sides. This advantageously reduces the mechanical stresses for a given cover plate thickness and provides additional thermal expansion joints. Thus, the number and thickness of cover plates provided in a given location may be varied to suit the local temperature and stress conditions.

FIG. 1 depicts the heat exchanger sealing zone 70 of the present invention. The sealing zone 70 is defined by baffle plates 72 and 74. The sealing zone 70 includes refractory felt seals 78 and one or more layers of intumescent material 76. It is likely that a pressure differential will exist between the lower flow passage 80 and the upper flow passage 90, and thus the refractory felt seals 78 reduce leakage and thermal stresses.

The present invention preferably includes the sealing zone 70, which is especially useful when the fluid entering the upper flow passage 90 is at a temperature above a service limit for intumescent material of 800° C. and the fluid exiting the lower flow passage 80 is below the service limit for the intumescent material. In this embodiment, the gap between the baffle plates 72 and 74 is filled with one or more layers of refractory material, such as refractory felt gaskets 78, cast with moldable refractory fiber, or stuffed with loose refractory fibers. The refractory material is in intimate contact with the baffle 74, which is in contact with the upper flow passage 90. This refractory material is initially installed in sealing contact with the tubes of the tube arrays 32, 42, the baffle 74, and the internal surface of the housing 100. One or more layers of intumescent material 76 are then provided between the refractory material 78 and the baffle 72. The intumescent material 76 is separated from the upper flow passage 90 by sufficient refractory 78, which acts as a thermal insulator to prevent overheating of the intumescent material 76. The two baffles are held in essentially fixed mechanical relationship by mechanical means such as connection to baffle support rods as known in the art, by mechanical capture between layers of extended heat exchange fins in intimate contact with the tubes 32, 42, or by other means apparent to one of ordinary skill in the art.

Upon heating above 300° C., the intumescent material 76 expands normal to the face of the baffles 72, 74. This expansion subjects the refractory 78 to substantial pressure. Under this pressure, the refractory 78 is compressed to a higher density than when it was installed. Further, the refractory 78 is forced by this pressure into improved sealing contact with the tubes of the tube arrays 32, 42 and internal surface of the housing 100. Because the cover plates of the housing 100 are essentially fixed, the expansion of the intumescent material 76 in a direction parallel to the tubes is thus converted into a uniform pressure to the refractory felt material 78.

The choice of thickness of the refractory material 78 and the quantity of intumescent material 76 is dictated by the desired compression of the refractory 78 in question, the refractory's anticipated shrinkage in service, the expansion characteristics of the intumescent material 76, and the mechanical strength of the baffles, pans (housing) and their mechanical supports. Thus, many different combinations are possible which may be uniquely suited to the exact type of heat exchanger anticipated and its operating conditions.

The especially preferred intumescent mat products are formulated to resist erosion by flowing heated gas. Thus, a captured intumescent seal of the present invention is inherently resistant to failure by erosion.

The outlet 150 of the upper flow passage 90 of the bottom module 20 is connected to a manifold section 210 of a top module 200 provided above the bottom module 20. The outlet 150 is preferably connected to the manifold section 210 by a slip joint 202 or by other means which provide fluid sealing and accommodate thermal expansion differences and is readily connected at the installation site, e.g., fabric or metal bellows. The manifold section 210 depicted in FIGS. 1 and 2A includes inclined side walls 212 and an inclined front wall 214. This inclination is dictated by the dimensions of the components employed, and is not intended to limit the invention in any way.

The second fluid exiting the outlet 150 enters the manifold section 210 and then travels through a superheater 220, through a boiler section 230, and through a preheater section 240, and then exits the top module 200. The top module 200 utilizes heat from the heated second fluid exiting the bottom module, in order to heat the first fluid before the first fluid enters the inlet manifold 52. The top module 200 is oriented in a vertical manner in order to take advantage of the natural buoyancy of the heated second fluid, however, an optional exhaust fan 250 can be provided at the exit 242 of the top module 200 in order to create a forced draft and reduce pressure within the bottom module 20. Thus, a vacuum can be attained within the bottom module 20 with regard to the second fluid.

The first fluid enters the top module 200 as a liquid via a pipe 244 that extends through the preheater section 240. The first fluid absorbs heat from the second fluid in the preheater section 240, and then travels via a pipe 246 to a boiler 232 in the boiler section 230. The first fluid is transformed from a liquid to a gas in the boiler 232 by absorbing heat from the second fluid in the boiler section 230. The gaseous first fluid then travels via a pipe 234 to the superheater section 220, where the first fluid travels along a pipe 222 that makes several passes through the superheater section 220. The first fluid then travels from the superheater section 220 via a pipe 224 to the inlet manifold 52. One or more additional fluids may be introduced at any point in the process. These fluids may be liquids, or gases. In one embodiment of the present invention, the additional fluid is a hydrocarbon feedstock for the production of hydrogen.

Figure 3A:
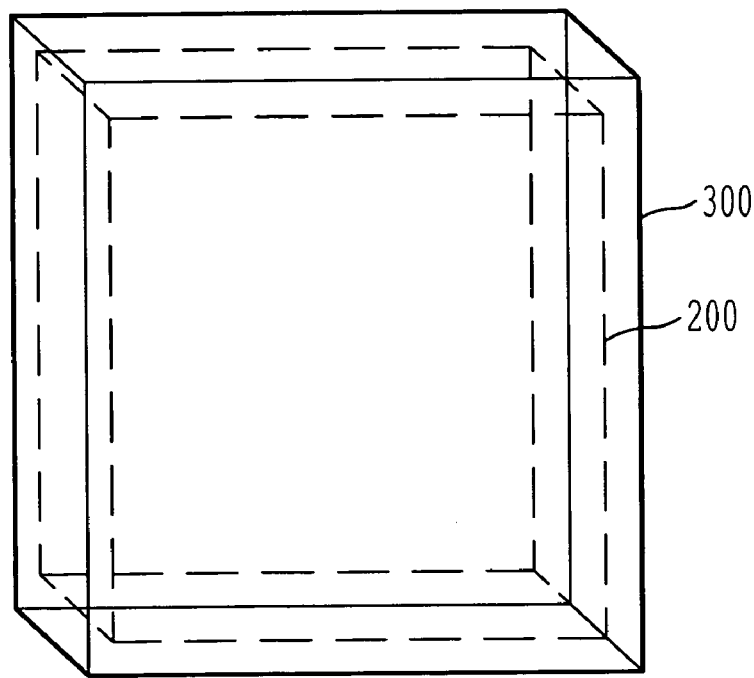
FIG. 3A depicts a schematic view of a container for a top module of the present invention.
Figure 3B:
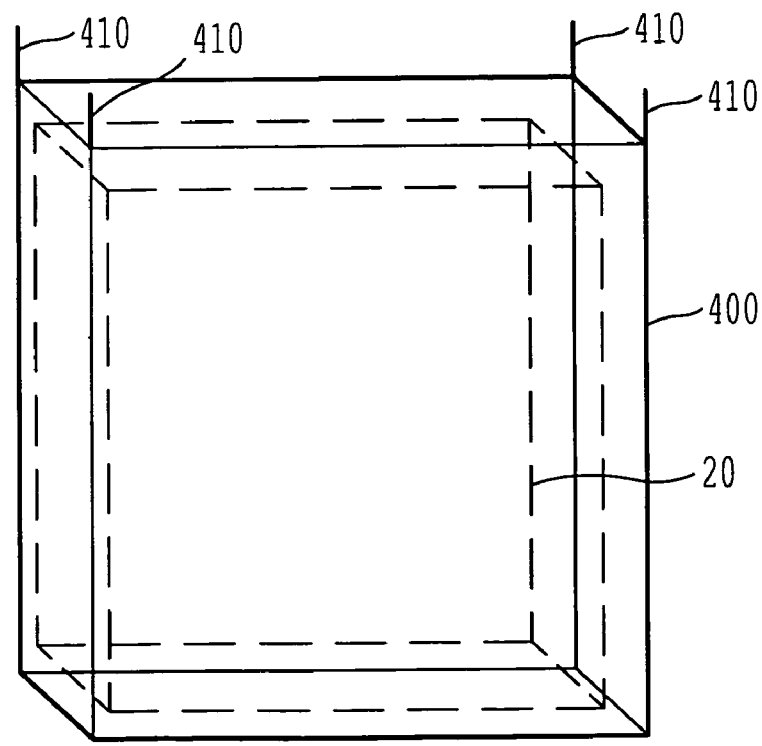
FIG. 3B depicts a schematic view of a container for a bottom module of the present invention.

FIGS. 3A and 3B depict schematic views of containers for the top module 200 and the bottom module 20 of the present invention. The containers are used as a means for efficiently shipping and assembling the heat exchanger 10 of the present invention. A container 300 is provided for the top module 200, in which the top module 200 is housed within the container 300 at the manufacturing plant and shipped in the container 300 to the assembly site. Similarly, a container 400 is provided for the bottom module 20, in which the bottom module 20 is housed within the container 400 at the manufacturing plant and shipped in the container 400 to the assembly site. When the containers 300, 400 arrive at the assembly site, then the bottom module container 400 is positioned in the appropriate final location, and then the top module container 300 is stacked on top of the bottom module container 400. Preferably, an alignment or mounting feature, such as the mounting feature 410 schematically shown in FIG. 3B, is provided the top module container 300 and/or the bottom module container 400. By stacking the top module container 300 on the bottom module container 400, the top module 200 will be joined to the bottom module 20 by the slip joint 202. Although not depicted, the exhaust fan 250 could also be housed within a shipping and assembly container that can be used to easily ship and assemble the exhaust fan 250 to the top of the top module 200.

Figure 4:
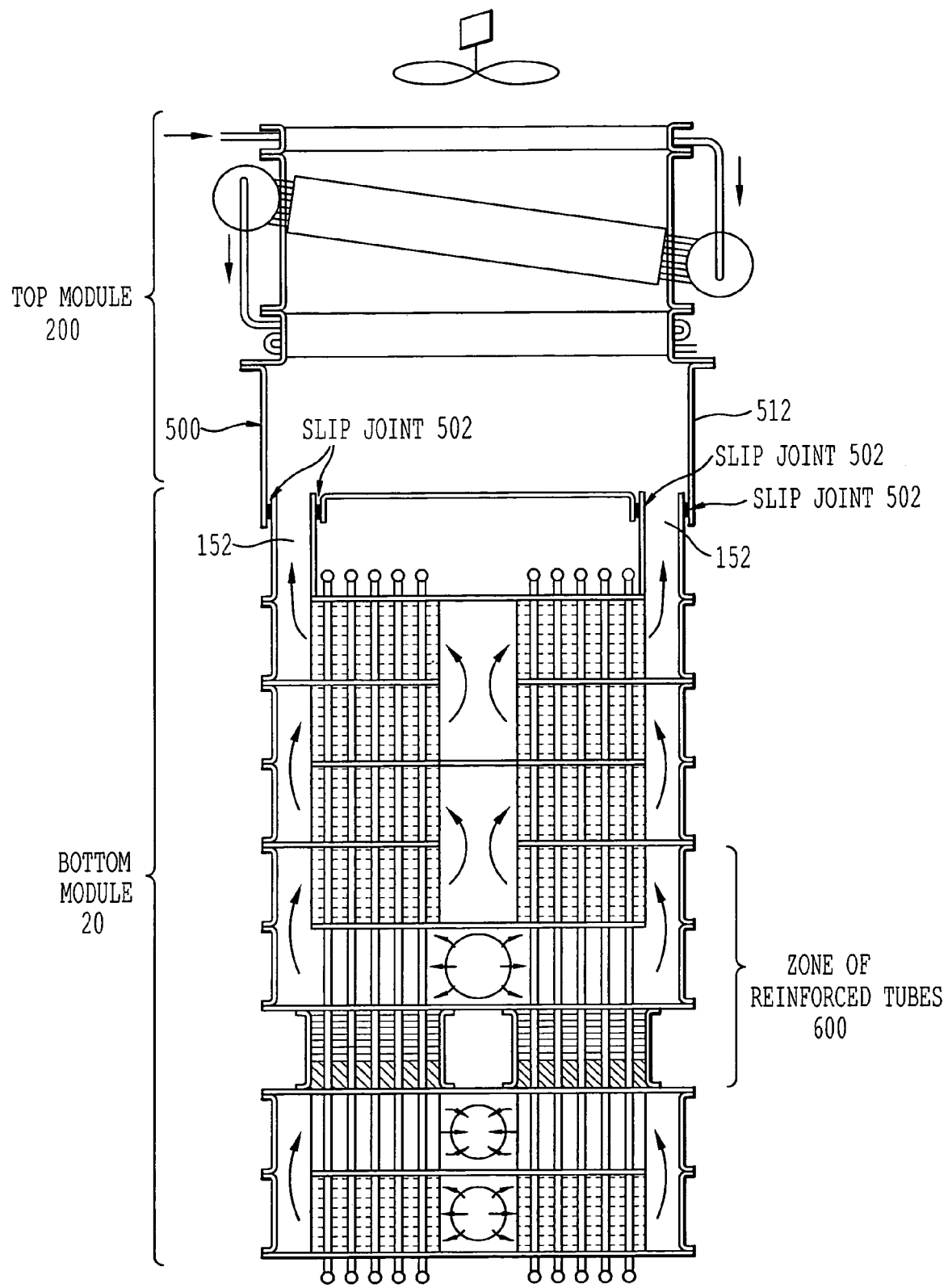
FIG. 4 depicts a front, cross-sectional view of a second embodiment of a heat exchanger of the present invention.

FIG. 4 depicts a second embodiment of the present invention in which the manifold section has been modified to accommodate two outlets 152 from the upper flow passage of the bottom module. In the embodiment depicted in FIG. 4, the number of cross-flow stages in the upper flow passage has been changed such that the flow exiting the bottom module is traveling out from the sides, rather than from the centrally located outlet 150 depicted in FIG. 1. The manifold section 500 depicted in FIG. 4 has generally vertical side walls 152, but the inclination of the walls will be dictated by the relative dimensions of the components, and is not limiting. The manifold section 500 is preferably connected to the bottom module by slip joints 502 or by some other means which can accommodate vertical thermal expansion differences and is readily connected at the installation site.

Figure 5:
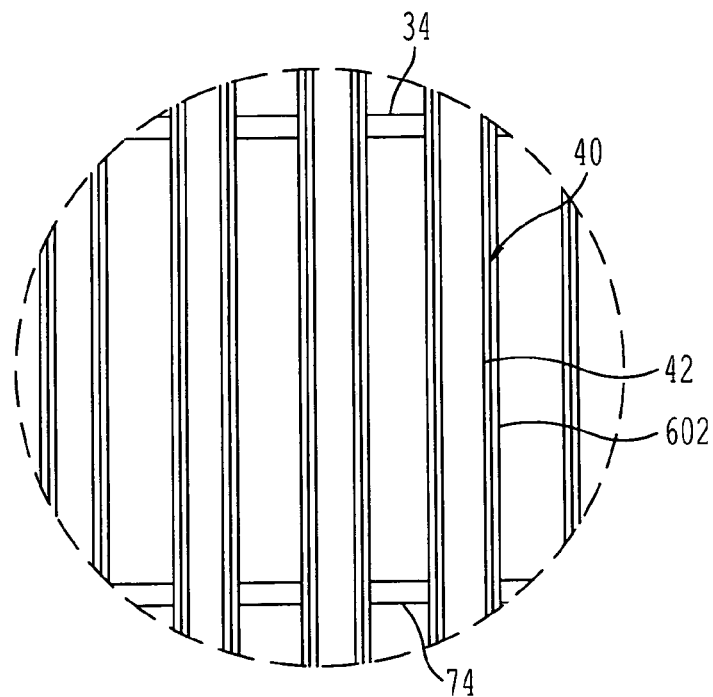
FIG. 5 depicts an enlarged cross-sectional view of a portion of the zone of reinforced tubes from FIG. 1.

In the embodiment depicted in FIGS. 1 and 4, the area of the heat exchanger adjacent to the inlet 140 to the upper flow passages 90 is the hottest portion within the heat exchanger. In this hot area, it is preferable to provide a zone of reinforced tubes 600. FIG. 5 depicts an enlarged cross-sectional view of a portion of the zone of reinforced tubes 600 from FIG. 1. In the zone of reinforced tubes 600, the tubes in both the first tube array 32 and the second tube array 42 are provided with an outer sleeve 602 that adds strength to the tubes of the tube arrays 32, 42 within this hot zone where creep stress might otherwise cause the failure of the tubes. This supporting sleeve advantageously does not transmit shear stress between the tubes 32, 42 and the sleeve, thus reducing the total stresses in the heat exchanger. It also advantageously reduces the material usage required to sustain a higher metal temperature. It also advantageously allows the use of a different material for the tubes and the support sleeve. Thus, a material with enhanced resistance to degradation under the second fluid conditions may be selected for the support sleeve while a material optimized for the first fluid conditions may be selected for the tubes themselves.

In the present application it is preferred to increase (as compared to the process described in the '856 patent) the flame temperature of the burner to a range of between 1050° C. and 1250° C. in order to allow for the reduction the flowrate of the second fluid without a drop in heat transfer to the first fluid. By reducing the flowrate of the second fluid, the pressure drop through the heat exchanger is advantageously reduced. When the temperature of the fluid is so high, then heat transfer is almost all radiant, and thus heat transfer fins (which increase pressure drop) are not necessary. Thus, no heat transfer fins are depicted in the zone of reinforced tubes 600 of the preferred embodiments of the present invention. The use of reinforcing outer sleeves 602 is preferred when the temperature of the second fluid is above about 900° C., and more preferably above 1000° C. The reinforcing outer sleeves 602 can be positioned on the outer surface of the tubes of the tube arrays 32, 42 using force fitting methods, rapid hydraulic or mechanical expansion methods, or other methods that produce a tight fit between the outer surface of the tube and the inner surface of the reinforcing outer sleeve.

Figure 7:
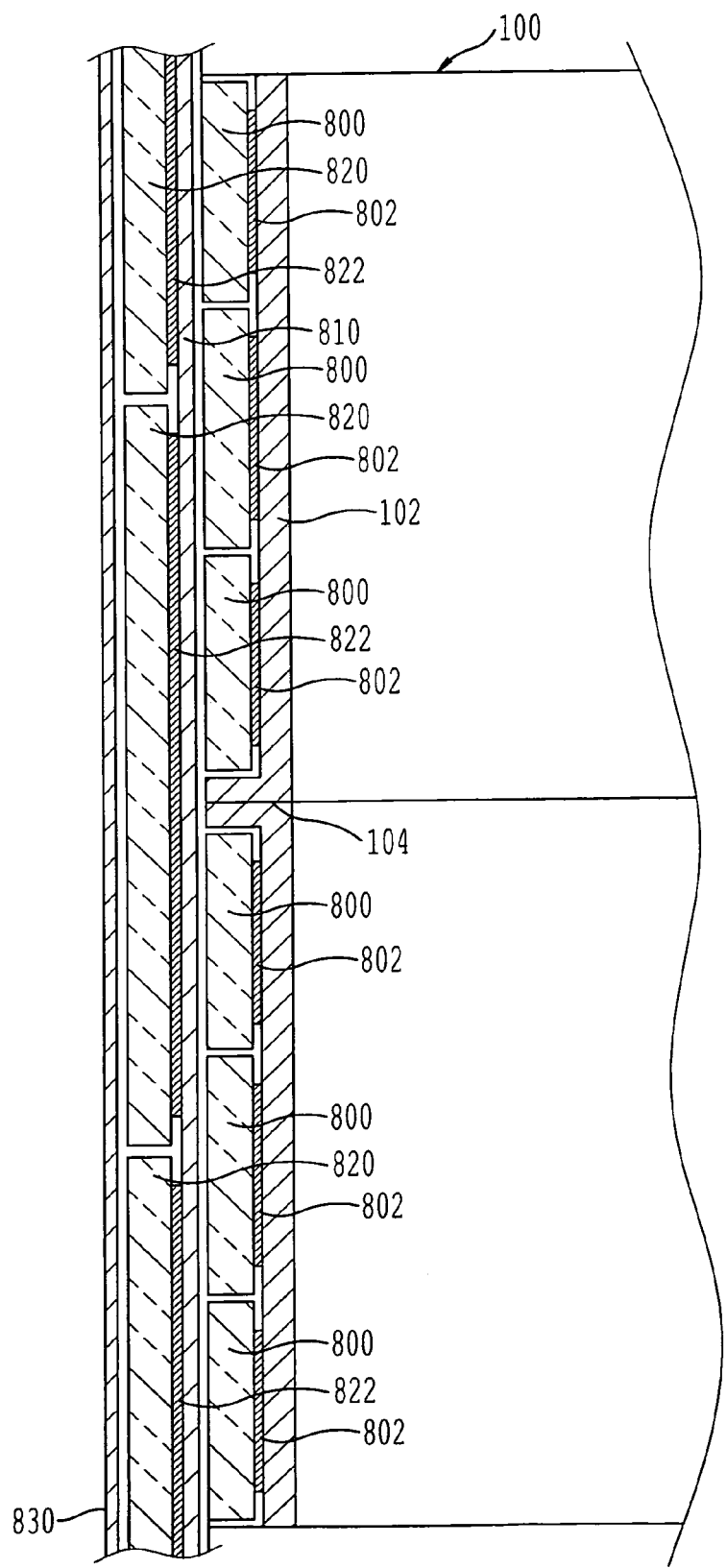
FIG. 7 depicts a cross-sectional view of the housing of the bottom module of the heat exchanger with various layers of insulation and shell casings.

FIG. 7 depicts a cross-sectional view of the housing of the bottom module 20 of the heat exchanger with various layers of insulation and shell casings. The present invention includes a first layer of insulation formed of a plurality of blocks of insulating refractory board 800. The blocks of refractory board 800 can be temporarily attached to the outer surface of the cover pans 102 by an adhesive 802, for example, masking tape. The blocks of refractory board 800 are attached to the outer surface of the cover pans 102 such that the entire or substantially the entire outer surface of the housing 100 is covered with the refractory boards 800. The adhesive 802 is intended to hold the refractory boards 800 in position until a first casing 810 is mounted on the outer surface of the refractory boards 800 and the housing 100. The first casing 810 holds the refractory boards 800 in place. The first casing is preferably made of plural panels of galvanized sheet metal that are joined together using fasteners.

As depicted in FIG. 7, the present invention also includes a second layer of insulation formed of a plurality of blocks of insulating refractory board 820. The blocks of refractory board 820 are preferably larger than the blocks of refractory board 800 in the first layer of insulation and preferably overlap with the blocks of refractory board 800 in the first layer such that any gaps between the boards 800 are covered by boards 820. The blocks of refractory board 820 can be temporarily attached to the outer surface of the first casing 810 by an adhesive 822, for example, masking tape. The blocks of refractory board 820 are attached to the outer surface of the first casing 810 such that the entire or substantially the entire outer surface of the first casing 810 is covered with the refractory boards 820. The adhesive 822 is intended to hold the refractory boards 820 in position until a second casing 830 is mounted on the outer surface of the refractory boards 820 and the housing 100. The second casing 830 holds the refractory boards 820 in place. The second casing is preferably made of plural panels of galvanized sheet metal that are joined together using fasteners.

In an alternative preferred embodiment, the present invention includes one or more layers of insulation with a single shell casing. For example, the present invention preferably includes a first layer of insulation formed of a plurality of blocks of insulating refractory board that are temporarily attached to the outer surface of the cover pans 102 by an adhesive. The blocks of refractory board are attached to the outer surface of the cover pans 102 such that the entire or substantially the entire outer surface of the housing 100 is covered with the refractory boards. Additionally, a second layer of insulation formed of a plurality of blocks of insulating refractory board is provided on an outer surface of the first layer of insulation using an adhesive such that the blocks of the second layer preferably overlap with the blocks of refractory board in the first layer. Additional layers of insulation can be provided as needed, for example an outermost layer of glass fiber matting or a layer of high performance insulation such as mesoporous silica or alumina. Then an outer casing is mounted on the outer surface of the outermost layer of insulation in order to hold the insulation in place.

The present invention splits the reactor into n=2 or greater independent tube bundles. The embodiment depicted in FIGS. 1 and 2A show configurations having two tube bundles 32, 42, however the present invention contemplates embodiments having more than two bundles where the second fluid flow is fed by common inlets and share common outlets. By increasing the number of independent bundles to a number greater than one, the present invention reduces the velocity of the second fluid flowing through a given tube bundle by 1/n. The reduction in velocity of the second fluid flow through a given bundle reduces the pressure drop of the second fluid in the bottom module by between 50% and 75%. The present invention also eliminates the overhanging burner box from the '060 application by creating a burner box in the middle of the two cores 32, 42, adjacent to the inlet 140. The flame is fully developed in the tube leading from the burner 130 to the inlet 140, which can be isolated by one or more elastic members (e.g., bellows) 132 in order to divorce the burner weight from the reactor. The burner 130 can be rigidly mounted to a supporting frame.

The present invention advantageously utilizes buoyancy of the heated second fluid in order to create a natural draft through the reformer/bottom module 20, superheater section 220, boiler section 230, and preheater section 240, plus optional forced daft from the exhaust ventilation fan 250, in order to reduce pressure inside the reformer. Ideally, a vacuum is attained inside the reformer housing. This effect is enhanced by the vertical arrangement of elements as depicted in order to get a greater "chimney height."

It should be noted that the exemplary embodiments depicted and described herein set forth the preferred embodiments of the present invention, and are not meant to limit the scope of the claims hereto in any way.

Numerous modifications and variations of the present invention are possible in light of the above teachings. It is therefore to be understood that, within the scope of the appended claims, the invention may be practiced otherwise than as specifically described herein.

What is claimed as new and desired to be secured by letters patent of the United States is:

1. A heat exchange apparatus comprising:
   a housing;
   a first array of fluid conduits provided within said housing, said first array of fluid conduits being configured to carry a first fluid;
   a second array of fluid conduits provided within said housing, said second array of fluid conduits being configured to carry the first fluid; and
   a first fluid passageway provided within said housing, said first fluid passageway being defined by an internal surface of said housing and by a baffle plate, said first fluid passageway being configured to carry a second fluid,
   wherein said baffle plate is configured to divide said first fluid passageway into a first flow path and a second flow path, and
   wherein said first array of fluid conduits extends through said first flow path and said second array of fluid conduits extends through said second flow path,
   a first insulating layer including a first plurality of blocks of insulating material provided about an outer surface of said housing; and
   a first casing provided about an outer surface of said first insulating layer.

2. The heat exchange apparatus according to claim 1, wherein said first array of fluid conduits extend through said baffle plate, and wherein said second array of fluid conduits extend through said baffle plate.

3. The heat exchange apparatus according to claim 1, wherein said first array of fluid conduits having a first plurality of heat transfer fins provided on outer surfaces of said fluid conduits thereof, said first plurality of heat transfer fins extending within said first flow path, and wherein said second array of fluid conduits having a second plurality of heat transfer fins provided on outer surfaces of said fluid conduits thereof, said second plurality of heat transfer fins extending within said second flow path.

4. The heat exchange apparatus according to claim 1, wherein said first array of fluid conduits includes a first row of fluid conduits, said first row of fluid conduits being fluidly connected to a first tubular inlet manifold and a first tubular outlet manifold, said first row of fluid conduits having a first heat transfer fin provided on outer surfaces thereof, said first heat transfer fin extending within said first flow path, and
wherein said first array of fluid conduits includes a second row of fluid conduits, said second row of fluid conduits being fluidly connected to a second tubular inlet manifold and a second tubular outlet manifold, said second row of fluid conduits having a second heat transfer fin provided on outer surfaces thereof, said second heat transfer fin extending within said first flow path.

5. The heat exchange apparatus according to claim 1, wherein said first array of fluid conduits includes a first row of fluid conduits and a second row of fluid conduits, said first row of fluid conduits and said second row of fluid conduits being fluidly connected to a tubular inlet manifold.

6. The heat exchange apparatus according to claim 1, wherein said first array of fluid conduits includes a first row of fluid conduits and a second row of fluid conduits, said first row of fluid conduits and said second row of fluid conduits being fluidly connected to a tubular outlet manifold.

7. The heat exchange apparatus according to claim 1, further comprising a sealing zone configured to define said first fluid passageway and a second fluid passageway within said housing.

8. The heat exchange apparatus according to claim 1, further comprising:
   a second insulating layer including a second plurality of blocks of insulating material provided about an outer surface of said first casing; and
   a second casing provided about an outer surface of said second insulating layer,
   wherein said second plurality of blocks of insulating material are positioned to overlap gaps between said first plurality of blocks of insulating material.

9. The heat exchange apparatus according to claim 8, wherein said first plurality of blocks of insulating material and said second plurality of blocks of insulating material are made of insulating refractory board, and wherein said first casing and said second casing are made of panels of galvanized sheet metal.

10. A heat exchange apparatus comprising:
   a housing;
   a first array of fluid conduits provided within said housing, said first array of fluid conduits being configured to carry a first fluid;
   a second array of fluid conduits provided within said housing, said second array of fluid conduits being configured to carry the first fluid; and
   a first fluid passageway provided within said housing, said first fluid passageway being defined by an internal surface of said housing and by a baffle plate, said first fluid passageway being configured to carry a second fluid,
   wherein said baffle plate is configured to divide said first fluid passageway into a first flow path and a second flow path,
   wherein said first array of fluid conduits extends through said first flow path and said second array of fluid conduits extends through said second flow path, and wherein said first fluid passageway includes an inlet and an outlet, and wherein said outlet is provided at a location vertically above said inlet.

11. A heat exchange apparatus comprising:
a housing;
a first array of fluid conduits provided within said housing, said first array of fluid conduits being configured to carry a first fluid;
a second array of fluid conduits provided within said housing, said second array of fluid conduits being configured to carry the first fluid; and
a first fluid passageway provided within said housing, said first fluid passageway being defined by an internal surface of said housing and by a baffle plate, said first fluid passageway being configured to carry a second fluid,
wherein said baffle plate is configured to divide said first fluid passageway into a first flow path and a second flow path,
wherein said first array of fluid conduits extends through said first flow path and said second array of fluid conduits extends through said second flow path, and
wherein said first fluid passageway includes an inlet, a first outlet, and a second outlet, wherein said first outlet is connected to said first flow path and said second outlet is connected to said second flow path, and wherein said first outlet and said second outlet are provided at a location vertically above said inlet.

12. A heat exchange apparatus comprising:
a housing;
a first array of fluid conduits provided within said housing, said first array of fluid conduits being configured to carry a first fluid;
a second array of fluid conduits provided within said housing, said second array of fluid conduits being configured to carry the first fluid; and
a first fluid passageway provided within said housing, said first fluid passageway being defined by an internal surface of said housing and by a baffle plate, said first fluid passageway being configured to carry a second fluid,
wherein said baffle plate is configured to divide said first fluid passageway into a first flow path and a second flow path, and
wherein said first array of fluid conduits extends through said first flow path and said second array of fluid conduits extends through said second flow path,
further comprising a preheater section having an additional fluid passageway fluidly connected to an outlet of said first fluid passageway, wherein said preheater section includes a fluid conduit extending through said additional fluid passageway, wherein said fluid conduit is configured to carry the first fluid, and wherein said fluid conduit is fluidly connected to an inlet manifold fluidly connected to said first array of fluid conduits and said second array of fluid conduits.

13. The heat exchange apparatus according to claim 12, wherein said outlet of said first fluid passageway is connected to said additional fluid passageway by a fluid sealing joint configured to accommodate differential expansion.

14. The heat exchange apparatus according to claim 13, wherein said fluid sealing joint is a slip joint.

15. The heat exchange apparatus according to claim 13, wherein said fluid sealing joint is a fabric or metal bellows.

16. The heat exchange apparatus according to claim 12, further comprising a boiler section having a boiler provided along said fluid conduit between said preheater section and said inlet manifold, wherein said additional fluid passageway extends through said boiler section, and wherein said boiler extends through said additional fluid passageway at a location between said preheater and said outlet of said first fluid passageway.

17. The heat exchange apparatus according to claim 16, further comprising a superheater section, wherein said additional fluid passageway extends through said superheater section, and wherein said fluid conduit extends through said additional passageway at a location between said boiler section and said outlet of said first fluid passageway.

18. The heat exchange apparatus according to claim 17, wherein said superheater section is provided at a location vertically above said outlet of said first fluid passageway, wherein said boiler section is provided at a location vertically above said superheater section, and wherein said preheater section is provided at a location vertically above said boiler section.

19. The heat exchange apparatus according to claim 18, wherein said first fluid passageway includes an inlet, and wherein said outlet of said first fluid passageway is provided at a location vertically above said inlet.

20. The heat exchange apparatus according to claim 19, further comprising an exhaust fan provided at an outlet of said additional fluid passageway.

21. The heat exchange apparatus according to claim 18, wherein said first fluid passageway includes an inlet, a first outlet, and a second outlet, wherein said first outlet is connected to said first flow path and said second outlet is connected to said second flow path, and wherein said first outlet and said second outlet are provided at a location vertically above said inlet.

22. The heat exchange apparatus according to claim 21, further comprising an exhaust fan provided at an outlet of said additional fluid passageway.

23. The heat exchange apparatus according to claim 18, further comprising:
a first container; and
a second container configured to be stacked on top of said first container,
wherein said housing is defined as a bottom module,
wherein said superheater section, said boiler section, and said preheater section are defined as a top module,
wherein said bottom module is housed within said first container,
wherein said top module is housed within said second container, and
wherein when said second container is stacked on top of said first container, then said outlet of said first fluid passageway is connected to said additional fluid passageway.

24. A heat exchange apparatus comprising:
a housing;
a first array of fluid conduits provided within said housing, said first array of fluid conduits being configured to carry a first fluid;
a second array of fluid conduits provided within said housing, said second array of fluid conduits being configured to carry the first fluid; and
a first fluid passageway provided within said housing, said first fluid passageway being defined by an internal surface of said housing and by a baffle plate, said first fluid passageway being configured to carry a second fluid,
wherein said baffle plate is configured to divide said first fluid passageway into a first flow path and a second flow path, and
wherein said first array of fluid conduits extends through said first flow path and said second array of fluid conduits extends through said second flow path, further comprising a sealing zone configured to define said first fluid passageway and a second fluid passageway within said housing, wherein said sealing zone comprises:

said baffle plate extending across an entire cross section of said housing;

an additional baffle plate extending across an entire cross section of said housing and defining said second fluid passageway;

a refractory gasket provided between said baffle plate and said additional baffle plate; and a layer of intumescent material provided between said baffle plate and said additional baffle plate, wherein said first array of fluid conduits and said second array of fluid conduits extend through said baffle plate, said additional baffle plate, said refractory gasket, and said layer of intumescent material.

25. The heat exchange apparatus according to claim 24, wherein said refractory gasket and said layer of intumescent material substantially entirely fill a gap between said baffle plate and said additional baffle plate.

26. The heat exchange apparatus according to claim 24, wherein said layer of intumescent material is made of a material that expands at a temperature above about 300° C.

27. A heat exchange apparatus comprising:

a housing:

a first array of fluid conduits provided within said housing, said first array of fluid conduits being configured to carry a first fluid;

a second array of fluid conduits provided within said housing, said second array of fluid conduits being configured to carry the first fluid; and a first fluid passageway provided within said housing, said first fluid passageway being defined by an internal surface of said housing and by a baffle plate, said first fluid passageway being configured to carry a second fluid, wherein said baffle plate is configured to divide said first fluid passageway into a first flow path and a second flow path, and wherein said first array of fluid conduits extends through said first flow path and said second array of fluid conduits extends through said second flow path, further comprising a sealing zone configured to define said first fluid passageway and a second fluid passageway within said housing, further comprising:

an additional fluid passageway connecting an outlet of said first fluid passageway and an inlet of said second fluid passageway; and a burner provided along said additional passageway, said burner being configured to heat the second fluid entering said inlet of said second fluid passageway.

28. The heat exchange apparatus according to claim 27, further comprising:

a preheater having an inlet fluid passageway fluidly connected to an inlet of said first fluid passageway, wherein said preheater includes a fluid conduit extending through said inlet fluid passageway, wherein said fluid conduit is configured to carry the first fluid, and wherein said fluid conduit is fluidly connected to an outlet manifold fluidly connected to said first array of fluid conduits and said second array of fluid conduits;

a cold combustion inlet fluidly connected to said inlet fluid passageway, wherein said cold combustion inlet is fluidly connected to said additional passageway at a location upstream of said burner; and means for controlling a flow of the second fluid from said cold combustion inlet to said preheater and from said cold combustion inlet to said burner.

29. The heat exchange apparatus according to claim 28, wherein said means for controlling comprises:

a first valve provided between said cold combustion inlet and said preheater to control a flow of the second fluid from said cold combustion inlet to said preheater; and a second valve provided between said cold combustion inlet and said burner to control a flow of the second fluid from said cold combustion inlet to said burner.

30. The heat exchange apparatus according to claim 28, further comprising an actuator configured to drive a control linkage connected to said first valve and said second valve to control said first valve and said second valve.

31. The heat exchange apparatus according to claim 28, further comprising a first actuator configured to control said first valve and a second actuator configured to control said second valve.

32. The heat exchange apparatus according to claim 28, wherein said means for controlling comprises a valve configured to continuously modulate flow between said cold combustion inlet and said preheater, and flow between said cold combustion inlet and said burner.

33. The heat exchange apparatus according to claim 28, wherein said means for controlling comprises:

a first pipe connecting said cold combustion inlet to said preheater;

a second pipe connecting said cold combustion inlet to said burner; and a valve configured to modulate flow, wherein said valve is provided in one of said first pipe and said second pipe, and wherein another of said first pipe and said second pipe does not have a valve therein.

34. A heat exchange apparatus comprising:

a housing;

a first array of fluid conduits provided within said housing, said first array of fluid conduits being configured to carry a first fluid;

a second array of fluid conduits provided within said housing, said second array of fluid conduits being configured to carry the first fluid; and a first fluid passageway provided within said housing, said first fluid passageway being defined by an internal surface of said housing and by a baffle plate, said first fluid passageway being configured to carry a second fluid, wherein said baffle plate is configured to divide said first fluid passageway into a first flow path and a second flow path, wherein said first array of fluid conduits extends through said first flow path and said second array of fluid conduits extends through said second flow path, and wherein fluid conduits of said first array of fluid conduits are provided on an outer surface thereof with reinforcing outer sleeves.

35. The heat exchange apparatus according to claim 34, wherein said reinforcing outer sleeves are provided in a zone within said housing, said zone being adapted to receive second fluid at a temperature of at least about 900° C.

36. The heat exchange apparatus according to claim 35, wherein said zone is adapted to receive second fluid at a temperature of at least about 1000° C.

37. The heat exchange apparatus according to claim 34, wherein said reinforcing outer sleeves is made from a material that is different from a material used to form said fluid conduits of said first array of fluid conduits.

38. The heat exchange apparatus according to claim 37, wherein a material used to form said fluid conduits of said first array of fluid conduits is selected based upon environmental conditions of the first fluid, and wherein a material used to form said reinforcing outer sleeves is selected based upon environmental conditions of the second fluid.

39. The heat exchange apparatus according to claim 34, wherein fluid conduits of said second array of fluid conduits are provided on an outer surface thereof with reinforcing outer sleeves.

40. A heat exchange apparatus comprising:
a housing;
a first array of fluid conduits provided within said housing, said first array of fluid conduits being configured to carry a first fluid;
a second array of fluid conduits provided within said housing, said second array of fluid conduits being configured to carry the first fluid; and
a first fluid passageway provided within said housing, said first fluid passageway being defined by an internal surface of said housing and by a baffle plate, said first fluid passageway being configured to carry a second fluid,
wherein said baffle plate is configured to divide said first fluid passageway into a first flow path and a second flow path,
wherein said first array of fluid conduits extends through said first flow path and said second array of fluid conduits extends through said second flow path, and
further comprising:
a plurality of insulating layers including blocks of insulating material provided about an outer surface of said housing; and
a casing provided about an outer surface of an outermost insulating layer of said plurality of insulating layers.

* * * * *